Figure 1:
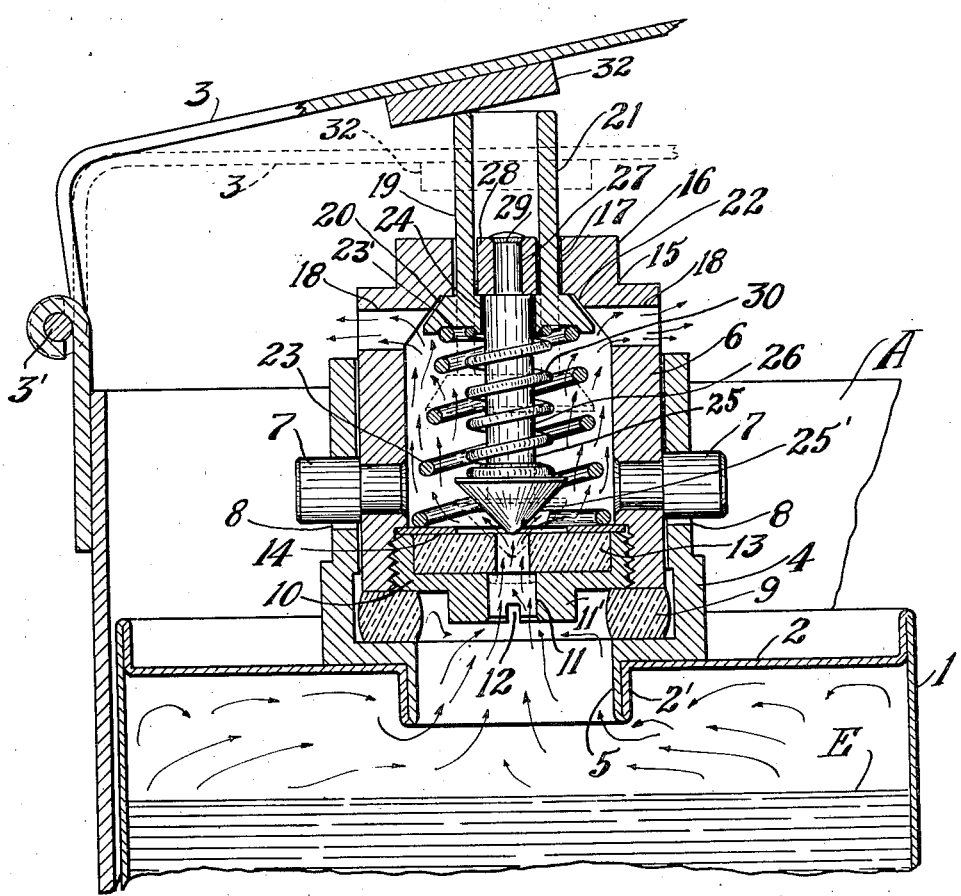

June 17, 1930.   R. C. MITCHELL   1,765,027
STORAGE BATTERY CELL
Filed March 8, 1927

INVENTOR.
Roy C. Mitchell
BY Henry Lanahan
ATTORNEYS.

Patented June 17, 1930

1,765,027

UNITED STATES PATENT OFFICE

ROY C. MITCHELL, OF EAST ORANGE, NEW JERSEY, ASSIGNOR TO EDISON STORAGE BATTERY COMPANY, OF WEST ORANGE, NEW JERSEY, A CORPORATION OF NEW JERSEY

STORAGE-BATTERY CELL

Application filed March 8, 1927. Serial No. 173,644.

My invention relates to storage battery cells and more particularly to an improved construction and arrangement designed for use in venting or controlling the venting of storage battery cells, especially cells of small size, having only a small capacity and discharge rate, such as those employed for portable electric safety lamps. It is to be understood, however, that my invention is equally well adapted for use in connection with battery cells of other sizes.

In some aspects the preesnt invention is an improvement on that disclosed in a pending application of Roscoe J. Smith, Serial No. 532,596, filed January 30, 1922, and entitled Storage battery cells and the operation thereof. Considerable trouble has been encountered in the use of the venting arrangement disclosed in said application because of the tendency which the valve for controlling the venting of the cell, has to stick and remain sealed or closed when it should be in open position, as, for example, when the cell is being charged or is placed in condition to be charged. Moreover, in the arrangement disclosed in said application, the valve controlling the venting of the cell is firmly maintained in closed position during the discharging operation of the cell and at all times during which the latter is supposedly connected in the circuit to which it is adapted to supply current. This latter condition is found somewhat objectionable in practice, for in the event such circuit is then broken or the cell then short-circuited so as to be charged by current from an adjacent cell or cells, the gas pressure is likely to build up within the cell to such an extent as to disrupt or damage the cell container. In this connection, it may be noted that while the cell does not "gas" to any appreciable extent while on discharge, it does "gas" quite freely while being charged and also to some extent while standing idle.

The principal object of my invention is to provide an improved construction and arrangement, preferably including a novel form of gas valve or vent device, for obviating the foregoing objectionable features, and wherein the valve for controlling the venting of the cell will preferably be positively opened when the cell is placed in condition for charging, or whenever it is disconnected from the circuit to which it is adapted to supply current, and wherein such valve will preferably be yieldingly held in closed position when the cell is connected or supposedly connected in such circuit, so that it will open automatically in case the gas pressure within the cell exceeds a certain limit.

Further objects and features of my invention will be hereinafter more fully described in the claims.

Figure 2:
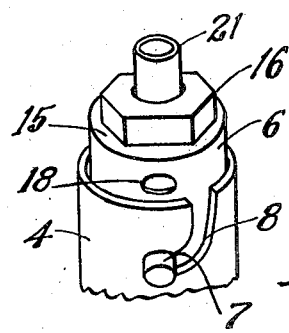

In order that my invention may be more clearly understood attention is directed to the drawing accompanying and forming a part of this specification, and in which:

Figure 1 is a fragmental sectional view, partly in elevation, of apparatus comprising a storage battery cell and a casing in which the cell is disposed, provided with a preferred embodiment of my improved venting device; and Fig. 2 is a perspective view of the upper portion of the venting device showing the manner in which the same is removably connected to the cell container.

Referring to the drawing reference character A represents a casing in which is preferably disposed a pair of small storage battery cells, only one of which is shown. Each of the cells comprises a container 1, which is preferably rectangular in shape and preferably formed of thin sheet steel which has been carefully nickel-plated so as to prevent oxidation. The usual alternately arranged positive and negative electrode plates (not shown) are disposed in a suitable electrolyte E within the container 1, the cell also being provided with the usual positive and negative poles (not shown) extending above the top 2 of the cell container through suitable fluid-tight stuffing boxes which serve to insulate the poles from the container. A suitable cover 3 is hinged as at 3' to the casing A at one side of the latter and when moved to closed position, as indicated in dotted lines in Fig. 1, is adapted to be fastened in such position by suitable locking means (not shown). The cover 3 of casing A may be provided with suitable means (not shown), such, for example, as the means disclosed in said application Serial No. 532,596, adapted when the cover is closed to engage the proper poles of the battery disposed in the casing and thereby connect the battery in the circuit with a miner's lamp or other current consuming means and adapted when the cover is opened to disengage said poles and thereby effect the disconnection of the battery from such circuit.

The top 2 of the cell container 1 is provided with a central opening surrounded by an annular depending flange 2'; and a cylindrical casing 4 provided with an upper open end is applied to the container 1 with the bottom thereof in engagement with the top 2 of the container and with an annular flange 5 depending from said bottom and surrounding a central opening therein, extending within and welded to the annular flange 2'. A hollow substantially cylindrical member or casing 6 is disposed and fits closely within the casing 4 and is suitably and removably secured thereto as by means of a bayonet joint connection comprising a pair of pins 7 secured to the casing 6 and extending laterally therefrom, and a pair of bayonet slots 8 provided in the casing 4 and respectively receiving the pin 7. The casing 4 has a slightly enlarged lower end portion within which is disposed a ring or annulus 9 of soft rubber or other suitable resilient material. The bayonet slots 8 are formed with the closed locking end portions thereof raised slightly above the lowermost and immediately preceding portions, the construction and arrangement being such that when the casings 4 and 6 are locked together, as shown, the resilient ring 9 is compressed between the bottom of the casing 4 and the lower end of the casing 6, forming a fluid-tight joint therebetween, and coacts with said casings to yieldingly hold the same thus locked together. It will be apparent that to either lock the casings 4 and 6 together or to unlock the same, it is necessary to force the casing 6 below the position shown against the resiliency of the ring 9, and in order to facilitate these operations the top 15 of the casing 6 is provided with an integral upwardly extending hexagonal portion 16 adapted to be engaged by a suitable tool. When the casings 4 and 6 are locked together as shown, the casing 6 extends a considerable distance above the upper end of casing 4. The casing 6 is provided at its lower end with a removable closure member or bottom 10, the bore of this casing being enlarged at the lower end portion thereof and the member 10 having screw-threaded connection with such enlarged portion of the bore. The member 10 is provided centrally thereof with an opening 11 which serves to establish communication between the interior of the cell container 1 and the casing 6. Reference character 11' represents a boss formed centrally of the closure member 10, and projecting downwardly therefrom, this boss having a slot 12 to enable member 10 to be readily removed from the casing 6 by a suitable tool adapted to be engaged with said slot. At its upper side the member 10 is provided centrally thereof with a cylindrical recess in which is disposed a soft rubber disk 13 having a central opening communicating with but slightly less in diameter than the opening 11 in member 10. The disk 13 is held in position in the recess provided in member 10, by means of a thin metal ring or washer 14 overlying the same and held at its edge portion by the member 10 against the shoulder formed between the main portion of the bore of casing 6 and the lower enlarged end portion of said bore. The top 15 of casing 6 is provided with a central cylindrical opening 17 therethrough in alignment with the opening 11 in the bottom or closure member 10, and the casing is also provided adjacent the top with openings 18 establishing communication between the interior of the casing and the outside atmosphere.

A novel vent device is provided for controlling communication between the cell container 1 and the interior of casing 6 through the openings in the member 10 and the rubber disk 13 to thereby control the venting of the cell. This vent device comprises a plunger 19 and a valve 25 having a resilient connection with the plunger, whereby the said plunger and valve are capable of relative movement. The plunger 19 consists of a conical head 20 and a hollow cylindrical or tubular portion 21 extending upwardly from the head 20 through the opening 17 in the top of casing 6. When the plunger 19 is in its uppermost position, as shown by full lines in Fig. 1, the head 20 thereof engages a conical seat 22 provided within the casing 6 at its upper end; and the plunger is biased to this position in all positions of the cell by means of a strong spiral conical spring 23 disposed within the casing 6 between the metal ring or washer 14 and the plunger head 20 and having its upper end seated in an annular recess 23' provided in the lower side of the head. The plunger head 20 has a central opening 24 therethrough which communicates with but is slightly less in diameter than the bore of the tubular portion 21 of the plunger. The valve 25 of the vent device consists of a mushroom head 25' adapted to seat against the rubber ring 13 about the central opening in the latter to close communication between the cell container 1 and the casing 6, and a cylindrical stem 26 extending upwardly from the head 25' and loosely through the opening 24 in the plunger head 20 into the tubular portion 21. The upper end portion of the valve stem 26 is reduced as indicated at 27, and has a collar 28 mounted thereon, the collar 28 being firmly secured to the valve stem by peaning over the end of the reduced portion 27, as shown at 29. The arrangement is such that collar 28 is adapted to be engaged by the shoulder formed between the bore of the tubular portion 21 and the opening 24 in the plunger head 20, so as to positively move the valve to open position when the plunger is raised to its uppermost position. It will thus be apparent that both the plunger 19 and the valve 25 are biased by the spring 23 to the positions shown in full lines in Fig. 1, regardless of the position of the cell. A spiral spring 30, preferably considerably weaker than the spring 23, is disposed about the stem 26 between the plunger head 20 and the valve head 25' and forms a resilient connection between the plunger and valve. It is apparent that the plunger 19 is connected with the valve 25 for movement relative thereto, that the collar 28 on the valve stem and the shoulder formed between the bore of the tubular portion 21 of the plunger and the opening 24 in the plunger head coact to limit such relative movement of the plunger in one direction and that the spring 30, which is a compression spring, tends to maintain the plunger at such limit of its said relative movement. If the plunger 19 is moved downwardly against the action of spring 23 to the dotted line position shown in Fig. 1, it will act through the spring 30 to first move the valve 25 to its closed position and to then partially compress said spring so as to thereby yieldingly hold the valve in such position. The strength of spring 30, however, is such that when the valve 25 is thus held in closed position, such spring will, in case the gas pressure within the cell container reaches a certain limit, yield under the action of such pressure on the valve head 25', so as to permit the valve to open and gas to escape from the container 1 through the casing 6 to the outside atmosphere, as indicated by the arrows in Fig. 1. The normal operation of the vent device described above, both in effecting the venting of the cell container and the sealing thereof, is not dependent upon the cell being in an upright or an inclined position, or in other words is not dependent upon the position of the cell.

Carried by the cover 3 of the casing A in which the battery cell is disposed, is a plate 32 adapted upon closing movement of said cover, to coact with the upper end of the tubular portion 21 of the plunger 19 to depress the latter, against the action of spring 23, and thereby through the resilient connection 30, to effect the closing of the valve 25 and the sealing of the cell container. As explained above, the closing of the cover 3 is also adapted to connect the cell in the circuit to which it is designed to supply current; and it will therefore be apparent that so long as the battery cell is thus connected in or supposedly connected in said circuit, the plunger 19 will be held depressed and will act through spring 30 to yieldingly hold the valve head 25' against the cushion seat provided by the rubber ring 13 about the opening through the latter, to thereby seal the cell against the escape of electrolyte. However, should said circuit then be broken or the cell short-circuited with a resultant building up of the gas pressure in the cell container 1 to the limit referred to above, the valve 25 would be automatically opened against the action of the spring 30; and the gas would escape to the outside atmosphere, as indicated by the arrows in Fig. 1, to thereby relieve the pressure within the container and obviate any liability of the container 1 being damaged by reason of such pressure. When the cover 3 is raised to the full line position shown in Fig. 1 and the battery thereby disconnected from the circuit to which it is designed to supply current, the strong spring 23 acts to move the plunger 19 to its uppermost position, and in such movement of the plunger the shoulder formed between the bore of the tubular portion 21 and the opening 24 in the plunger head 20 engages the collar 28 and coacts therewith to positively move the valve 25 to and hold the same in open position.

While I have shown and specifically described a preferred embodiment of my invention, it is to be understood that the same is subject to various changes and modifications without departure from the spirit of the invention or the scope of the appended claims.

Having now described my invention, what I claim as new and desire to protect by Letters Patent is as follows:

1. A battery cell having a vent device, said vent device comprising a member having an opening, a valve adapted to cooperate with said opening to control the passage of fluid therethrough, a member movable with respect to said valve, means associated with said valve and movable member for limiting the movement of the latter with respect to the valve in one direction, and a compression spring disposed between said valve and movable member and tending to maintain the latter at such limit of its said relative movement, said movable member when in a given position acting through said means positively to hold the valve open and when moved from said position acting to compress said spring and through such spring to move the valve to and yieldingly hold the same in closed position.

2. A battery cell having a vent device, said vent device comprising a member having an opening, a valve adapted to cooperate with said opening to control the passage of fluid therethrough, a member movable with respect to said valve, said valve and movable member being each provided with means adapted to coact to limit the movement of said movable member with respect to the valve in one direction, and a compression spring disposed between said valve and movable member and tending to maintain the latter at such limit of its said relative movement, said movable member being biased to a given position in which said means are in direct engagement and act to hold the valve open, said movable member when moved from such position acting to compress said spring and through the latter to move the valve to and yieldingly hold the same in closed position.

3. A vent device for storage battery cells, comprising a member having an opening, a valve adapted to cooperate with said opening to control the passage of fluid therethrough 4 a member movable with respect to the valve and adapted in one position thereof directly to engage and positively hold the valve open, a spring constantly tending to hold said movable member in said position in all positions of a cell to which the vent device may be applied, and a second spring disposed between said movable member and valve adapted when such member is moved from said position to move the valve to and yieldingly hold the same in closed position, substantially as described.

4. A vent device for storage battery cells, comprising a member having an opening, a valve adapted to cooperate with said opening to control the passage of fluid therethrough, a member movable with respect to the valve and adapted in one position thereof to engage and positively hold the valve open, a spring constantly tending to hold said movable member in said position in all positions of a cell to which the vent device may be applied, and a second spring weaker than the first mentioned spring and disposed between said movable member and valve adapted when such member is moved from said position to move the valve to and yieldingly hold the same in closed position, substantially as described.

5. A battery cell having a vent device, said vent device comprising a member having an opening therethrough, a valve for controlling said opening, a member having a resilient connection with said valve and adapted when moved to one position positively to open said valve and when moved to another position to act through said resilient connection to move the valve to and yieldingly hold the same in closed position, and means adapted, in all positions of the cell, constantly to exert a force tending to hold said member in said first position, substantially as described.

6. A vent device for storage battery cells, comprising a member having an opening therethrough, a valve for controlling said opening comprising a head adapted to engage said member about said opening and a stem extending from the head, an element movable towards and away from said member and slidably connected with the valve stem, means for limiting the movement of said element with respect to the valve in a direction away from said member whereby in such movement the valve will be positively moved to open position, and a spring disposed between said element and the valve head whereby when said element is moved towards said member the valve will be moved to and yieldingly held in closed position, said element being independent in its action on said valve of the position occupied by a cell to which the vent device may be applied substantially as described.

7. A vent device for storage battery cells comprising a member having an opening therethrough, a valve for controlling said opening comprising a head adapted to engage said member about said opening and a stem extending from the head, an element movable towards and away from said member and slidably connected with the valve stem, means for limiting the movement of said element with respect to the valve in a direction away from said member whereby in such movement the valve will be positively moved to open position, a spring disposed between said element and the valve head whereby when said element is moved towards said member the valve will be moved to and yieldingly held in closed position, and a second spring constantly tending to move said element away from said member, substantially as described.

8. A vent device for storage battery cells, comprising a member having an opening, a valve adapted to cooperate with said opening to control the passage of fluid there-through, a member movable with respect to the valve and adapted in one position thereof directly to engage and positively hold the valve open, a spring disposed between said movable member and valve, said member being adapted when moved from said position to act through said spring to move the valve to and yieldingly hold the same in closed position, said member being independent in its action on said valve of the position occupied by a cell to which the vent device may be applied, and a casing within which said members and valve are disposed, said movable member having a portion extending therefrom outwardly of the casing, substantially as described.

9. In combination, a storage battery cell, and a vent device therefor comprising a member having a passageway for establishing communication between the interior of the cell and the outside atmosphere, a valve for controlling said passageway, a member movable with respect to said valve, means associated with said valve and movable member for limiting the movement of the latter with respect to the said valve in one direction, and a compression spring disposed between said valve and movable member and tending to maintain the latter at such limit of its said relative movement, said movable member when in a given position acting through said means positively to hold the valve open and when moved from said position acting to compress said spring and through the latter to move the valve to and yieldingly hold the same in closed position, said movable member being independent in its action on said valve of the position occupied by said cell.

10. In combination, a storage battery cell and a vent device therefor, comprising a member having a passageway for establishing communication between the interior of the cell and the outside atmosphere, a valve for controlling said passageway, an element which, in a given position, coacts with said valve positively to hold the latter open, said element having a resilient connection with said valve, whereby such element is adapted upon movement thereof from said given position, to act through such resilient connection to move the valve to and yieldingly hold the same in closed position, and resilient means constantly tending to hold said element in said given position in all positions of said cell, substantially as described.

11. In combination, a storage battery cell having a container for the battery elements and electrolyte, said container having an opening in the top thereof, a vent device for said cell comprising a casing applied to said container about said opening and adapted to have communication with the container through such opening, said casing also having communication with the outside atmosphere, and a device disposed in said casing comprising a valve for controlling communication of the casing with the cell container and a member having a resilient connection with said valve, said member being biased to a position in engagement with a wall of said casing in which position it directly engages the valve and positively holds the same open, said member also having a portion extending through a wall of the casing whereby it is adapted to be moved from without the casing away from said position and thereby, through said resilient connection, move the valve to and yieldingly hold the same in closed position, substantially as described.

12. A battery cell having a container for the battery elements and electrolyte, said container having vent means comprising a casing applied to the container, said casing having an opening establishing communication between the same and the container, a valve for controlling said opening, and spring pressed means adapted to coact with the valve and tending to move the same to open position, said spring-pressed means having a resilient connection with the valve and being actuatable from without the casing to move the valve through such resilient connection to and yieldingly hold the same in closed position, substantially as described.

13. A battery cell having a container for the battery elements and electrolyte, said container having an opening, and means for controlling said opening comprising a valve, spring-pressed means adapted to coact with said valve and tending to move the same to open position, said spring-pressed means having a resilient connection with the valve and being adapted to act through such resilient connection to move the valve to and yieldingly hold the same in closed position, substantially as described.

14. In combination, a casing having a cover, a battery cell disposed in said casing and having a container for the battery elements and electrolyte, said container having an opening, a valve for controlling said opening, and means controlled by said cover and adapted upon the closing thereof to move the valve to and yieldingly hold the same in closed position and upon the opening of said cover positively to effect the opening of said valve, substantially as described.

15. In combination, a casing provided with a cover, a battery cell disposed in said casing and having a container for the battery elements and electrolyte, said container having an opening, a valve for controlling such opening, said valve being biased to open position, and means actuatable by said cover, upon movement of the latter in a given direction, to move the valve to and yieldingly hold the same in closed position, substantially as described.

This specification signed this 7th day of March 1927.

ROY C. MITCHELL.